United States Patent [19]

Geiger

[11] Patent Number: 5,416,855
[45] Date of Patent: May 16, 1995

[54] IMAGE COMPRESSION METHOD AND APPARATUS

[75] Inventor: Davi Geiger, Plainsboro, N.J.

[73] Assignee: Massachusetts Institute of Technology, Cambridge, Mass.

[21] Appl. No.: 845,171

[22] Filed: Mar. 3, 1992

[51] Int. Cl.$^6$ .............................................. H04N 7/13
[52] U.S. Cl. .................................. 382/254; 382/199; 358/447
[58] Field of Search ...................... 382/54, 56, 22, 27; 358/432, 433, 428, 430, 447, 448

[56] References Cited

U.S. PATENT DOCUMENTS

| | | | |
|---|---|---|---|
| 4,827,533 | 5/1989 | Tanaka | 382/54 |
| 4,853,794 | 8/1989 | Fukumoto et al. | 358/447 |
| 4,908,698 | 3/1990 | Enomoto et al. | 358/13 |
| 4,908,872 | 3/1990 | Toriu et al. | 382/22 |
| 5,031,227 | 7/1991 | Raasch et al. | 382/22 |
| 5,148,501 | 9/1992 | Enomoto et al. | 382/56 |

FOREIGN PATENT DOCUMENTS 2205704 12/1988 United Kingdom.

OTHER PUBLICATIONS

G. S. Robinson, "Detection and Coding of Edges Using Directional Masks", *Optical Engineering,* vol. 16, No. 6, Nov.-Dec. 1977.
K. Takahashi and M. Ohta, "A Two-Dimensional Sequential Coding Scheme for Blob Pictures", pp. 676-682 (1982).
IEE Colloquium, The Institution of Electrical Engineering, Savoy Place, London, WC2R.
S. Marshall and L. S. Scharf, SPIE, Intelligent Robots and Computer Vision, vol. 579, (1985).
S. Marshall et al., "Contour Coding of Images", IEEE, pp. 1009-1012, (1986).
S. Marshall, "Application for Image Contours to Three Aspects of Image Processing: Compression, Shape Recognition and Stereopsis", pp. 604-608.
M. Kunt et al., "Recent Results in High-Compression Imagin Codeing". IEEE Transactions on Circuits and Systems, vol. CAS34, No. 11, Nov. 1987.
M. Kocher and R. Leonardi, "Adaptive Region Growing Technique Using Polynomial Functions for Image Processing", Signal Processing 11, pp. 47-60, (1986).
D. Moran and O. J. Morris, "Region and Texture Coding of TV Pictures", pp. 536-540.
Marshall, S., "Contour Based Image Coding", May 1990, IEE Colloquium on Low Bit Rate Image Coding, Dig. 075, p. 4/1-4.

*Primary Examiner*—Stephen Chin
*Assistant Examiner*—Timothy J. May
*Attorney, Agent, or Firm*—Hamilton, Brook, Smith & Reynolds

[57] ABSTRACT

An image processing system is capable of image compression including smoothing and edge detection for representing an image with a minimal amount of data and image reconstruction from the minimal data. The system comprises an array of pixel locations having intensity data representing the intensities of an image. The system also comprises a processor having a smoothing module for iteratively smoothing the intensity data to eliminate noise associated therewith. The processor also has an edge detection module for iteratively detecting pixel locations defining edges of regions of substantially constant intensity across the image. The processor further comprises a reconstruction module for reconstructing the image from the pixel locations defining edges and the intensity data associated with said pixel locations.

28 Claims, 9 Drawing Sheets

IMAGE COMPRESSION METHOD AND APPARATUS

BACKGROUND OF THE INVENTION

Image processing involves the manipulation of images by a computer. These images are characterized according to their intensity values. The intensity values are captured by an imager and held in an array of elements. Storage of the array of image data in the computer often requires a large amount of memory and also results in low data communication rates. Thus, the computer may comprise an image compression process which represents the image data in compact form for storage in memory. The computer may also include a reproduction process for reconstructing the image from the stored data. However, problems still exist in the area of reconstruction of an image from a few data points. In many existing techniques, a somewhat large amount of data is required; otherwise the reconstructed image is blurred or distorted. Thus a need exists for an efficient image processing technique which minimizes the amount of image data required to reconstruct an image.

SUMMARY OF THE INVENTION

The present invention comprises an image processing system capable of reconstructing an image from a minimal amount of image data representing the image. The system includes a memory for storing edge location data which defines edges of regions of substantially uniform intensity of the image. The memory also stores intensity data which defines the intensity of the edges. Each piece of intensity data may define the intensity of a single edge location or a plurality of edge locations which define an edge. The system employs a processor having a reconstruction module for iteratively updating the intensity of image locations across the image. For each iteration, the reconstruction module performs weighted combinations of the intensities at image locations with the intensities of respective neighboring image locations. From iteration to iteration, the iterative updating process produces directional spreading of intensity data from the edges to image locations across the image.

In one embodiment, for a given iteration, the reconstruction module updates each image location without intensity data by performing a combination of the intensities of respective neighboring image locations. The computed intensity data value is subsequently provided to the image location. For each image location with intensity data, the reconstruction module updates the intensity for the image location by performing a weighted combination of the intensity of the image location and the intensities of neighboring image locations. The updated intensity data subsequently replaces the previous intensity data for the image location. Preferably, the reconstruction module comprises software instructions for performing the above-described iterative updating process.

The reconstruction module may employ additional refinements for improving processing speed and increasing image reconstruction efficiency. In one embodiment, the reconstruction module iteratively updates each image location by performing combinations involving neighboring image locations not separated from the image location by an intervening edge. Further, this combination may also be limited to neighboring image locations having non-zero intensity data values. Thus, for a given image location, only those neighboring image locations satisfying the non-edge separation condition and the non-zero intensity condition are employed in the iterative updating process.

To further increase the speed and efficiency of the reconstruction process, the reconstruction module may perform the iterative updating on only non-edge image locations. Additionally, the processor may be a parallel processing device such that the reconstruction module iteratively updates the intensity of each image location in parallel.

In another embodiment, an image processing system is capable of image compression for representing the image with a minimal amount of data and image reconstruction from the minimal data. The system comprises an array of pixel locations having original intensity data representing the intensities of an image. The system also includes a processor which may comprise a smoothing module for iteratively smoothing the original intensity data to eliminate any undesirable noise associated therewith. For each iteration, the smoothing module computes a smoothed intensity data value for each pixel location to replace the smoothed intensity data value computed for the previous iteration. To accomplish this, the module performs a combination comprising the original intensity data for each pixel location with previously smoothed intensity data of respective neighboring pixel locations and previously smoothed intensity data for the pixel location. Preferably, the smoothing module employs software instructions for performing the smoothing process.

The processor further comprises an edge detection module for iteratively detecting pixel locations defining edges across the image. For each iteration, the edge detection module magnifies a combination of a predetermined edge threshold and a sum of combinations of intensity data of a group of pixel locations associated with a pixel location. These combinations reflect the magnitude of the gradient of the image intensity at that pixel location and preferably include the intensity data of the pixel location and adjacent pixel locations. Ultimately, the edge detection module determines those pixel locations corresponding to edges based on a function of the magnified combination for each pixel location. The edge detection module preferably employs software instructions for performing edge detection.

The image processing system of the present invention offers advantages over existing systems. For example, the present invention achieves high image compression as only edge location data and corresponding intensity data must be stored to allow for reconstruction. Further, the intensity data stored is minimized in two ways. Directional spreading of the intensities from the edges to the image locations across the image allows for storing only a single intensity data value per edge location, instead of having to save two intensity data values (one data value for each side of the edge). Also, each intensity data value may correspond to multiple edge locations which form an edge of a region of substantially uniform intensity, instead of saving an intensity data value for each edge location. Another advantage is that the system is extremely fast and requires a minimal amount of iterations to reconstruct a good quality image from a small amount of data.

DETAILED DESCRIPTION OF THE INVENTION

Figure 1:
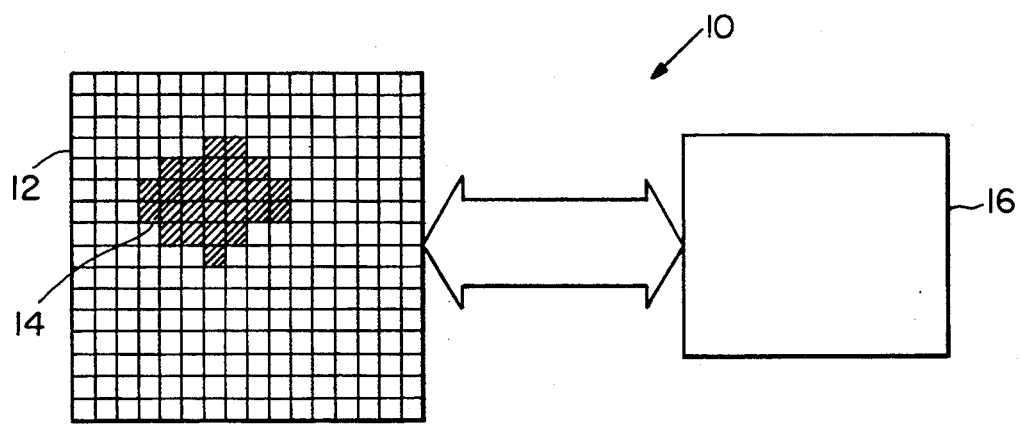
FIG. 1 illustrates an image processing system incorporating the principles of the present invention.

An image processing system incorporating the principles of the present invention is shown in FIG. 1. The system 10 comprises an array 12 of stored data capable of representing an image 14 as a plurality of intensities at pixel locations. The array 12 is connected to an image processor 16 capable of image compression which includes optional smoothing and edge detection for characterizing the image with a minimal amount of data and image reconstruction from the minimal data. The image processor 16 may be implemented as a group of software instructions in a single chip of a computer, a charge coupled device array or a module within a digital signal processor.

Figure 2:
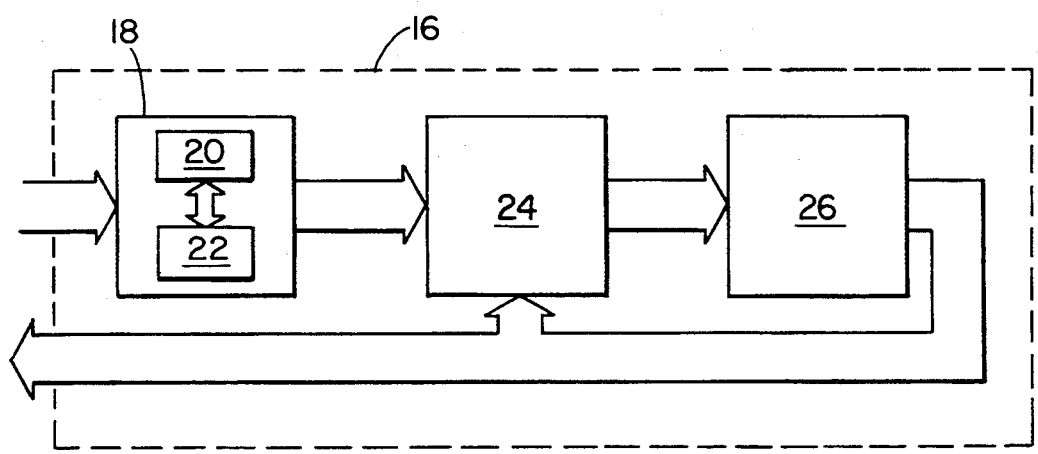
FIG. 2 illustrates the processing modules of an image processor of the present invention.

The processing modules employed in the processor 16 for image processing are illustrated in FIG. 2. To that end, the image compression module 18 comprises an edge detection module 20 for locating edges of regions of substantially uniform intensity across the image. The image compression module 18 also includes an optional smoothing module 22 for minimizing undesired noise associated with the image. Although the smoothing module 22 is optional, in a preferred embodiment, the smoothing module 22 and the detection module 20 operate in parallel and interactively. For each iteration, the smoothing module 22 employs edge location values computed by the edge detection module 20 for the previous iteration in its smoothing computations. Similarly, the edge detection module 20 employs smoothed intensity values computed by the smoothing module 22 for the previous iteration in its edge detection computations.

Edge locations provided by the edge detection module 20 and smoothed intensity data corresponding to the edge locations provided by the smoothing module 22 are stored in a memory 24. In accordance with the present invention, the processor 16 further comprises an image reconstruction module 26 capable of reproducing the original image 14 from the data stored in a memory 24. Each processing module represents a group of software instructions located in one of the aforementioned processing devices.

Figure 3:
FIG. 3 illustrates an image prior to image processing in accordance with the present invention.
Figure 4C:
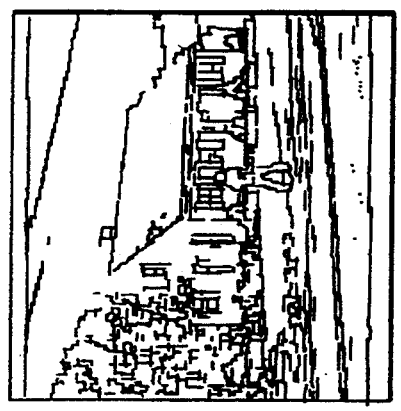
FIGS. 4A–4C are a series of image representations illustrating the edge detection process for a given image.
Figure 4B:
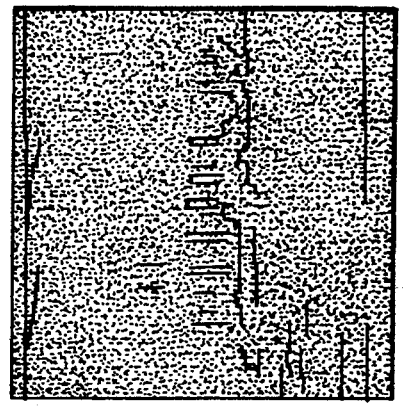
Figure 4A:
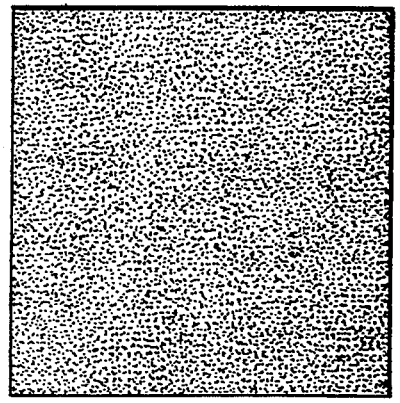

FIG. 3 shows an image prior to image compression processing. FIGS. 4A–4C provide an illustrative representation of the edge detection process. In FIG. 4A, an initial blurred representation of edges of the image of FIG. 3 is shown. After several iterations of the edge detection process, some edge locations are visible as shown in FIG. 4B. After the requisite number of iterations of the edge detection process, the edge locations are visible as shown in FIG. 4C.

In accordance with the present invention, the reconstruction module is capable of reconstructing the image from the edge data and intensity data stored in memory. Starting with pixel edge locations and associated intensities, the reconstruction module performs an iterative process for each pixel location which causes the intensities to "directionally spread" from the edges across the array. After a plurality of iterations, the "directional spreading" of intensities has reached every pixel location of the array producing a high quality reconstructed image.

Figure 5A:
FIGS. 5A–5C are a series of image representations illustrating the image reconstruction process.
Figure 5B:
Figure 5C:

FIGS. 5A–5C provide an illustrative representation of the reconstruction process. FIG. 5A illustrates the pixel edge locations and associated intensity data as obtained by the image compression module. The colored regions indicate the intensities of pixel edge locations and the white regions indicate a lack of intensity data at non-edge pixel locations. Beginning with the data of FIG. 5A, the iterative reconstruction process causes directional spreading of the intensities from the edges across the array. FIG. 5B illustrates partial reconstruction due to directional spreading after four iterations. In FIG. 5C, a high quality reconstructed image is produced after eighty iterations of the reconstruction process.

The image compression module performs smoothing and edge detection processing interactively and in parallel. However, each process is described separately herein for the purpose of clarity. Accordingly, for a given pixel location (x,y), the smoothing process for obtaining an updated intensity value $f^{N+1}(x,y)$ is hereinafter explained with reference to FIG. 6. In determining $f^{N+1}(x,y)$ for an iteration N, the smoothing module performs a computation which employs the smoothed intensity value computed for the previous iteration $f^N(x,y)$, the smoothed intensity values of neighboring pixels computed for the previous iteration $f^N(x\pm1,y\pm1)$ and the original intensity value g(x,y). More specifically, the smoothing module determines $f^{N+1}(x,y)$ by computing a weighted average of $f^N(x,y)$ and a parameter (A) as follows:

$$f^{N+1}(x,y) = (1-w)f^N(x,y) + wA \quad (1)$$

where w corresponds to the weighting factor and is described below. The parameter (A) is a weighted combination of g(x,y) and those non-zero intensities $f^N(x\pm1,y\pm1)$ of neighbors which are not separated from (x,y) by a full edge. A simplified equation for the parameter (A) is as follows:

$$A = \frac{g(x,y) + \mu_N \Sigma f^N(x \pm 1, y \pm 1) E_L(x \pm 1, y \pm 1)}{1 + \mu_n \Sigma E_L(x \pm 1, y \pm 1)} \quad (2)$$

where $\mu_n$ is a weighting factor (discussed below) and $E_L$ is an edge factor associated with each neighboring pixel ($x\pm 1, y\pm 1$). More specifically, the edge factor $E_L$ indicates whether a neighboring pixel ($x\pm 1, y\pm 1$) is separated from (x,y) by no edge ($E_L=1$), a half edge ($E_L=0.5$) or a full edge ($E_L=0$). In determining $f^{N+1}(x,y)$ for pixel (x,y) of FIG. 6, pixel location (x−1,y) would not be included in the computation because a full edge (dashed lines) separates (x−1,y) and (x,y) such that $E_L(x-1,y)$ equals zero. Also, pixels (x,y+1) and (x,y−1) are separated from (x,y) by a half edge, so $E_L(x,y+1)$ and $E_L(x,y-1)$ are equal to one-half. Pixel (x+1,y) has no edge separating it from (x,y) so $E_L(x+1,y)$ equals one. Thus, the computation for the smoothed intensity value $f^{N+1}(x,y)$ would be as follows:

$$f^{N+1}(x,y) = \frac{(1-w)f^N(x,y) + w[g(x,y) + \mu_N(f^N(x+1,y) + (0.5)f^N(x,y+1) + 0.5f^N(x,y-1))]}{1 + 2\mu_N} \quad (3)$$

Figure 7:
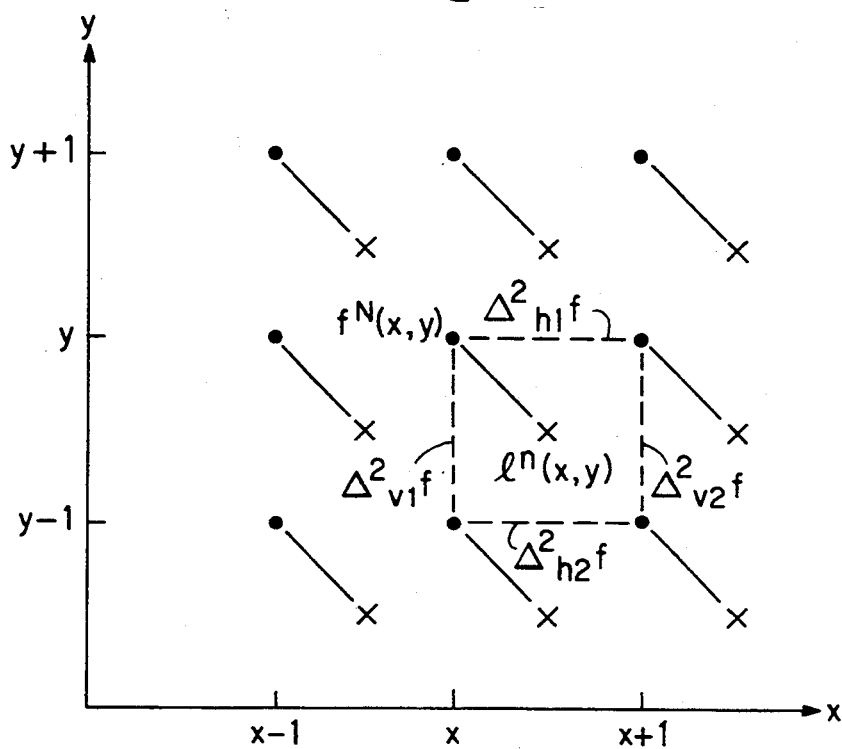
FIG. 7 illustrates the edge detection process for an image location.

For iteration N, the edge detection process for obtaining an edge location indication $1^{N+1}(x,y)$ for the pixel location (x,y) is hereinafter explained with reference to FIG. 7. The edge location $1^{N+1}(x,y)$ is offset from pixel (x,y) such that it is "surrounded" by four pixel locations having intensity values $f^N(x+0$ or $1, y-0$ or $1)$. Note that the edge location is considered "surrounded" by the four pixel locations for processing purposes only. Actually the edge location $1^{N+1}(x,y)$ is merely an indicator of the intensity of its associated pixel $f^{N+1}(x,y)$ relative to its neighboring pixel locations.

The edge detection module determines the intensity differences $\Delta^2_{h1}f$, $\Delta^2_{h2}f$, $\Delta^2_{v1}f$, and $\Delta^2_{v2}f$ for adjacent pairs of the four pixels. The sum ($\Sigma\Delta^2 F$) of these intensity differences is combined with the square of an edge threshold ($T^2$). The combination is then magnified by a parameter $\mu_N\beta_N$ (described below) and appears as follows:

$$(\mu_N\beta_N)[T^2 - \Sigma\Delta^2 f]. \quad (4)$$

The magnified combination is employed in an edge function which determines the edge location value $1^{N+1}(x,y)$. If the magnified combination in equation (4) is a large negative number, the edge function determines that $1^{N+1}(x,y)$ is about one. As such, the pixel (x,y) corresponds to an edge location of a region of substantially uniform intensity $f^{N+1}(x,y)$. Alternatively, if the magnified combination in equation (4) is a large positive number, the edge function would determine that $1^{N+1}(x,y)$ is about zero. Then, the pixel (x,y) would not define an edge location.

Figure 8:
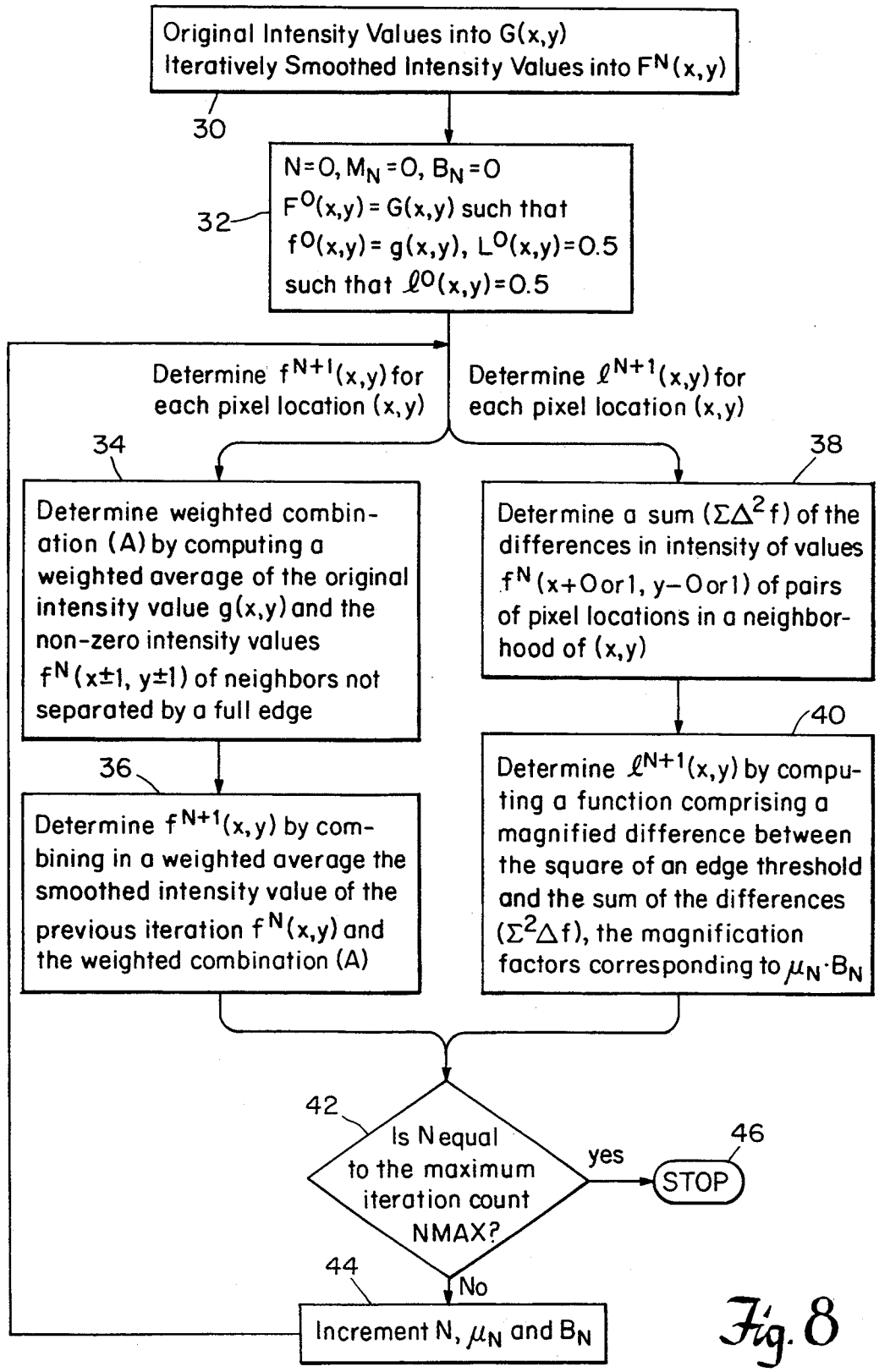
FIG. 8 is a flow chart of an image compression module which performs smoothing and edge detection.

A flow chart of the image compression module is provided in FIG. 8. As noted previously, the smoothing module and the edge detection module operate in parallel and interactively. For each iteration N, the smoothed intensity value $f^{N+1}(x,y)$ and the edge location value $1^{N+1}(x,y)$ are computed for each pixel location (x,y) of the array in a serial manner or preferably in parallel. The iteratively computed values are stored in a smoothed intensity array $F^N(x,y)$ and an edge location array $L^N(x,y)$.

Before initiating the smoothing and edge detection processes of FIG. 8, the image compression module copies the original image intensity values into an array G(x,y) as shown at 30. As such, the original noisy intensity data for each pixel location (x,y) is stored in an array location g(x,y) within the array G(x,y). Next, the compression module 18 copies the contents of G(x,y) into a smoothing array $F^N(x,y)$ having array locations f(x,y) and sets each location 1(x,y) of an edge location array L(x,y) equal to one-half (as shown at 32). Since each edge location value 1(x,y) is initially one-half, the initial edge location array L(x,y) would appear as a blurred image (see FIG. 4A). The image compression module also initializes the parameters N, $\mu_N$, $\beta_N$, w and T. The parameter N simply refers to the iteration number and is initially set to zero. The parameters $\mu$ and $\beta_N$ are functions which control the smoothness and the uncertainty of the smoothness process respectively. The parameter $\mu_N$ is preferably a function having its initial value $\beta_o$ also equal to linear function having its initial value to equal to zero. The parameter $\mu_N$ is preferably an exponential zero. The parameter w is a convergence parameter used in the smoothing module to provide weighting between the weighted combination (A) and the smoothed intensity data $f^N(x,y)$. The parameter w may be any number between zero and two, but preferably 1.2. The parameter T refers to the edge threshold and is employed in the edge detection process to determine edges of regions of substantially constant intensity.

After the above-described parameters have been initialized, the edge detection module and the smoothing module operate in parallel and interactively. For an iteration N and a pixel location (x,y), the smoothing module computes the parameter (A) which is the weighted average of g(x,y) and non-zero intensities $f^N(x\pm 1, y\pm 1)$ of neighbors not separated from (x,y) by a full edge (34). Recall that (A) is represented as follows:

$$A = \frac{g(x,y) + \mu_N \Sigma f^N(x \pm 1, y \pm 1) E_L(x \pm 1, y \pm 1)}{1 + \mu_n \Sigma E_L(x \pm 1, y \pm 1)}.$$

Figure 6:
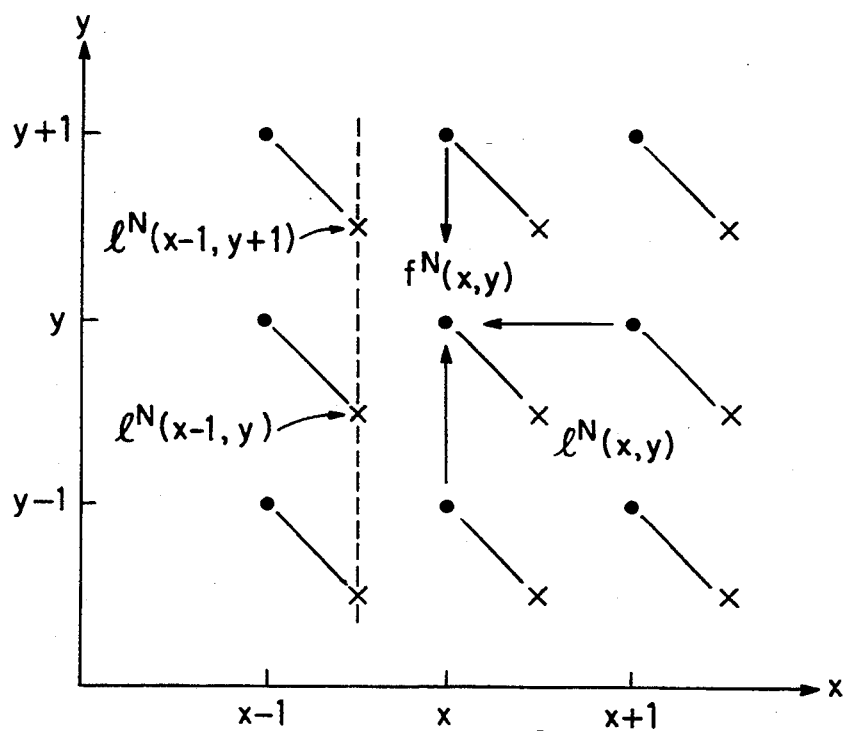
FIG. 6 provides a graphical illustration of the smoothing process for an image location.

Since the edge location array L(x,y) is represented herein as an offset lattice with respect to the corresponding intensity array $F^N(x,y)$, each pixel location is separated from another by a pair of edge locations. The edge factor ($E_L$) provides a value for each pixel location based on this pair of edge locations. For example, a neighboring pixel (x−1,y) is separated from (x,y) by edge locations $1^N(x-1,y)$ and $1^N(x-1,y-1)$ as shown in FIG. 6. Since both locations equal one due to the edge (dashed line), the edge factor manipulates these values providing an output equal to zero. More generally, the edge factor manipulates the values of any pair of edge locations to provide an output indicating whether two pixel locations are separated by a full edge ($E_L=0$), a half edge ($E_L=0.5$) or no edge ($E_L=1$). For the pixel (x,y) and neighboring pixels ($x\pm 1, y\pm 1$) of equation (2), $E_L$ is as follows:

$$E_L(x-1,y) = 1 - 0.5(1^N(x-1,y+1) + 1^N(x-1,y))$$

$$E_L(x+1,y) = 1 - 0.5(1^N(x,y+1) + 1^N(x,y)) \quad (5)$$

$$E_L(x,y+1) = 1 - 0.5(1^N(x-1,y+1) + 1^N(x,y+1))$$

$$E_L(x,y-1) = 1 - 0.5(1^N(x-1,y) + 1^N(x,y))$$

Each value of $E_L$ for neighbors $(x\pm1, y\pm1)$ is employed in the computation of (A). After computing (A), the smoothing module determines $f^{N+1}(x,y)$ (as shown at 36) by combining $f^N(x,y)$ and (A) in accordance with equation (1) as follows:

$$f^{N+1}(x,y) = (1-w)f^N(x,y) + wA. \quad (1)$$

Once $f^{N+1}(x,y)$ is computed, the smoothing module updates the intensity at pixel location $(x,y)$ with $f^{N+1}(x,y)$.

In parallel with the smoothing process, the edge detection module performs an edge detection process to determine the value of edge location $1^{N+1}(x,y)$ associated with $f^{N+1}(x,y)$. As stated previously, the edge location $1(x,y)$ is "surrounded" by four pixel locations having intensities $f^N(x,y)$, $f^N(x+1,y)$, $f^N(x,y-1)$ and $f^N(x+1,y-1)$ (as shown in FIG. 6). The edge detection module determines the intensity differences $\Delta^2_{h1}f$, $\Delta^2_{h2}f$, $\Delta^2_{v1}f$ and $\Delta^2_{v2}f$ for adjacent pairs of these pixel locations (38 of FIG. 8). The sum $(\Sigma\Delta^2 f)$ of these intensity differences is combined with the square of the edge threshold $(T^2)$ as shown in equation (4) (40). Further, the magnified combination of equation (4) is employed in an edge location function represented as follows:

$$l^{N+1}(x,y) = \frac{1}{1 + e^{\mu N \beta_N [T^2 - \Sigma\Delta^2 f]}} \quad (6)$$

If the magnified combination of equation (4) is a large negative number, the function $e^{(-)}$ approaches zero such that:

$$l^{N+1}(x,y) = \frac{1}{1+0} = 1.$$

As such, $f^{N+1}(x,y)$ would correspond to the intensity of an edge location of a region of substantially constant intensity. Alternatively, if the magnified combination of equation (4) is a large positive number, the function $e^{(+)}$ approaches infinity such that:

$$l^{N+1}(x,y) = \frac{1}{1+\infty} = 0.$$

As such, $f^{N+1}(x,y)$ would not correspond to an edge location.

After $f^{N+1}(x,y)$ and $1^{N+1}(x,y)$ have been determined, the image compression module determines whether the maximum iteration count (NMAX) has been reached (42). If NMAX has not been reached, the module increments N, $\mu_N$ and $\beta_N$ (44). After incrementing the aforementioned parameters, further smoothing and edge detection is performed. This routine continues until NMAX is reached, whereupon image compression processing stops. At this point, the pixel locations defining edges $(1^{NMAX}(x,y)=1)$ are stored in array $IS(x,y)$ and the corresponding intensities $(f^{NMAX}(x,y))$ are stored in array $F(x,y)$. Both arrays are stored in the memory (24 of FIG. 2) and are accessed for image reconstruction as described below.

Figure 9C:
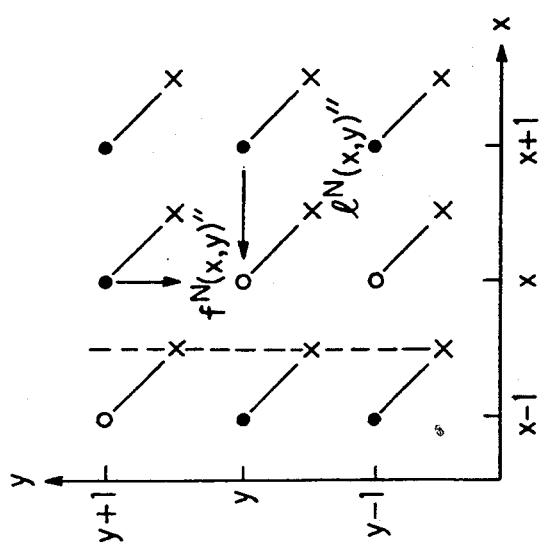
FIG. 9C graphically illustrates the reconstruction process for an image location having no associated intensity value.

In accordance with the present invention, the image reconstruction module (26 of FIG. 2) is capable of reconstructing the image from the data $(IS(x,y)$ and $F(x,y))$ stored in memory. The reconstruction module performs iterative processing on each pixel location such that intensities "directionally spread" from the edge locations across the array. During reconstruction processing, pixel locations are categorized into three distinct types: pixel edge locations, non-edge pixel locations with non-zero intensity values and non-edge pixel locations with zero intensity value. For each iteration, the reconstruction module implements different processing functions for the three types of pixel locations. For example, a pixel edge location $(x,y)$ is shown in FIG. 9A. For an iteration N, the reconstruction module determines that $(x,y)$ corresponds to an edge location by verifying that $1^N(x,y)$ equals one. Once it is determined that $(x,y)$ is an edge location, no further processing is performed to update $f^N(x,y)$.

Figure 9B:
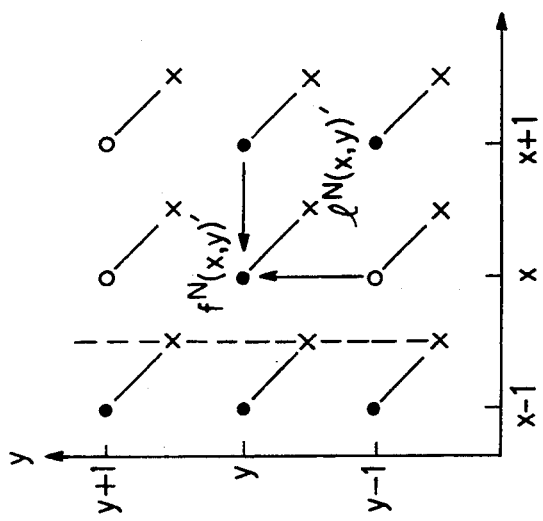
FIG. 9B graphically illustrates the reconstruction process for an image location being adjacent to an intervening edge.
Figure 9A:
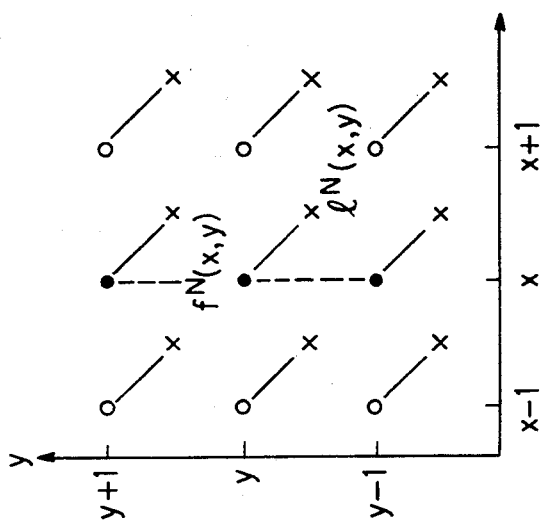
FIG. 9A graphically illustrates the reconstruction process for an image location which is characterized as an edge location.

A non-edge pixel location $(x,y)'$ with a non-zero intensity value $f^N(x,y)'$ is shown in FIG. 9B. For iteration N, the module first determines that $f^N(x,y)'$ is non-zero. Next, the module determines an updated intensity value $f^{N+1}(x,y)'$ by computing a weighted average of $f^n(x,y)'$ and the non-zero intensities $f^N(x\pm1,y\pm1)'$ of neighbors separated from $(x,y)'$ by less than a full edge. The computation for $f^{N+1}(x,y)'$ is performed in accordance with the following equation:

$$f^{N+1}(x,y)' = \frac{f^N(x,y)' + \mu\Sigma f^N(x\pm1,y\pm1)'E_L(x\pm1,y\pm1)'}{1 + \mu\Sigma E_L(x\pm1,y\pm1)} \quad (7)$$

where $\mu$ is a fixed weighting factor between 0.2 and 0.4 and where $E_L$ is the edge factor described previously. In determining $f^{N+1}(x,y)'$ for $(x,y)'$ of FIG. 9B, pixel $(x-1,y)'$ would not be included in the computation because a full edge separates it from $(x,y)'$ such that $E_L(x-1,y)'$ equals zero. Also, pixels $(x,y+1)'$ and $(x,y-1)'$ would not be included in the computation because their corresponding intensities are zero (open circle). Thus, the computation for $f^{N+1}(x,y)'$ is performed in accordance with the following equation:

$$f^{N+1}(x,y)' = \frac{f^N(x,y)' = \mu f^N(x+1,y)'}{1+\mu}. \quad (8)$$

A non-edge pixel location $(x,y)''$ with a corresponding intensity value $F^N(x,y)''$ is shown in FIG. 9C. For iteration N, the module first determines that $f^N(x,y)''$ equals zero (indicated by open circle). Next, the module provides an intensity value $f^{N+1}(x,y)''$ by computing an average of the non-zero intensities $f^N(x\pm1,y\pm1)''$ of neighbors separated from $(x,y)''$ by less than a full edge. The computation for $f^{N+1}(x,y)''$ is performed in accordance with the following equation:

$$f^{N+1}(x,y)'' = \frac{\Sigma f^N(x\pm1,y\pm1)''E_L(x\pm1,y\pm1)''}{\Sigma E_L(x\pm1,y\pm1)''} \quad (9)$$

In determining $f^{N+1}(x,y)''$ for $(x,y)''$ of FIG. 9C, pixel $(x-1,y)''$ would not be included in the computation because a full edge separates it from $(x,y)''$ such that $E_L(x-1,y)''$ equals zero. Also, pixel $(x,y-1)''$ would not be included in the computation because its corresponding intensity is zero (open circle). Note further that pixel $(x,y+1)''$ is separated from $(x,y)''$ by a half edge $(E_L(x,y+1)''=0.5)$ such that the computation for $f^{N+1}(x,y)''$ is as follows:

$$f^{N+1}(x,y)'' = \frac{F^N(x+1,y) + (0.5)F^N(x,y+1)}{1.5} \quad (10)$$

Figure 10A:
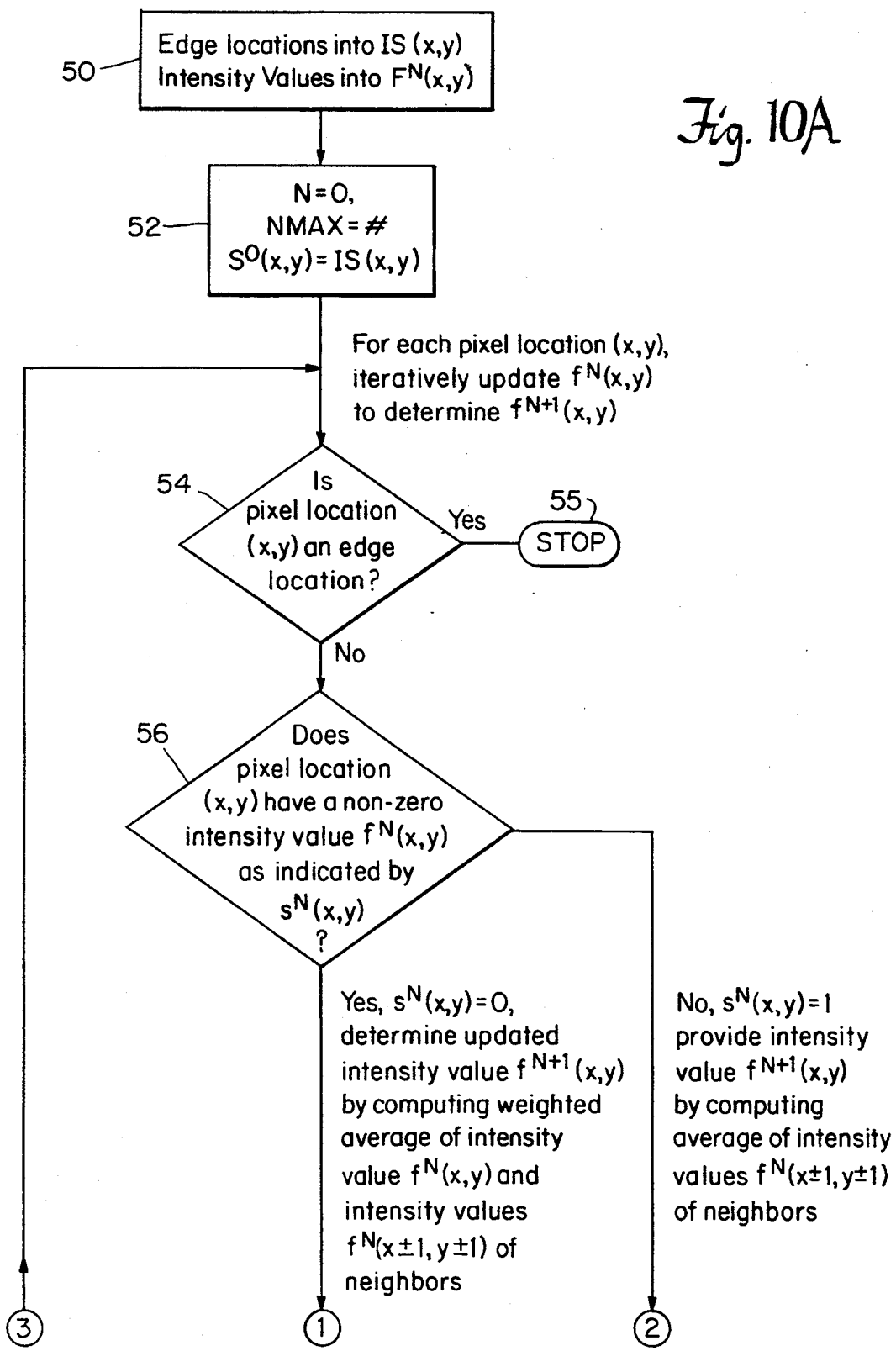
FIGS. 10A–10C are a flow chart of an image reconstruction module.
Figure 10B:
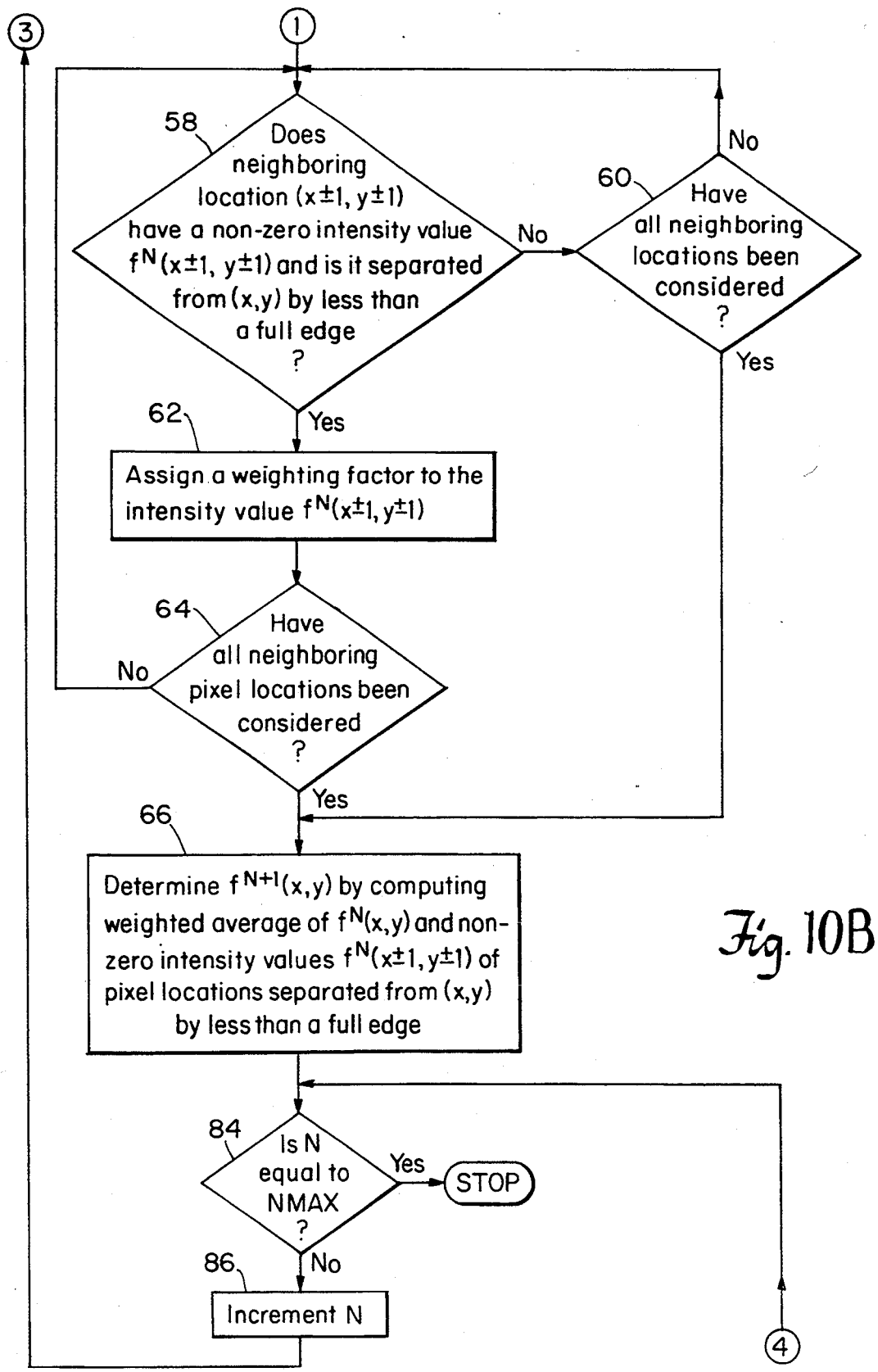
Figure 10C:
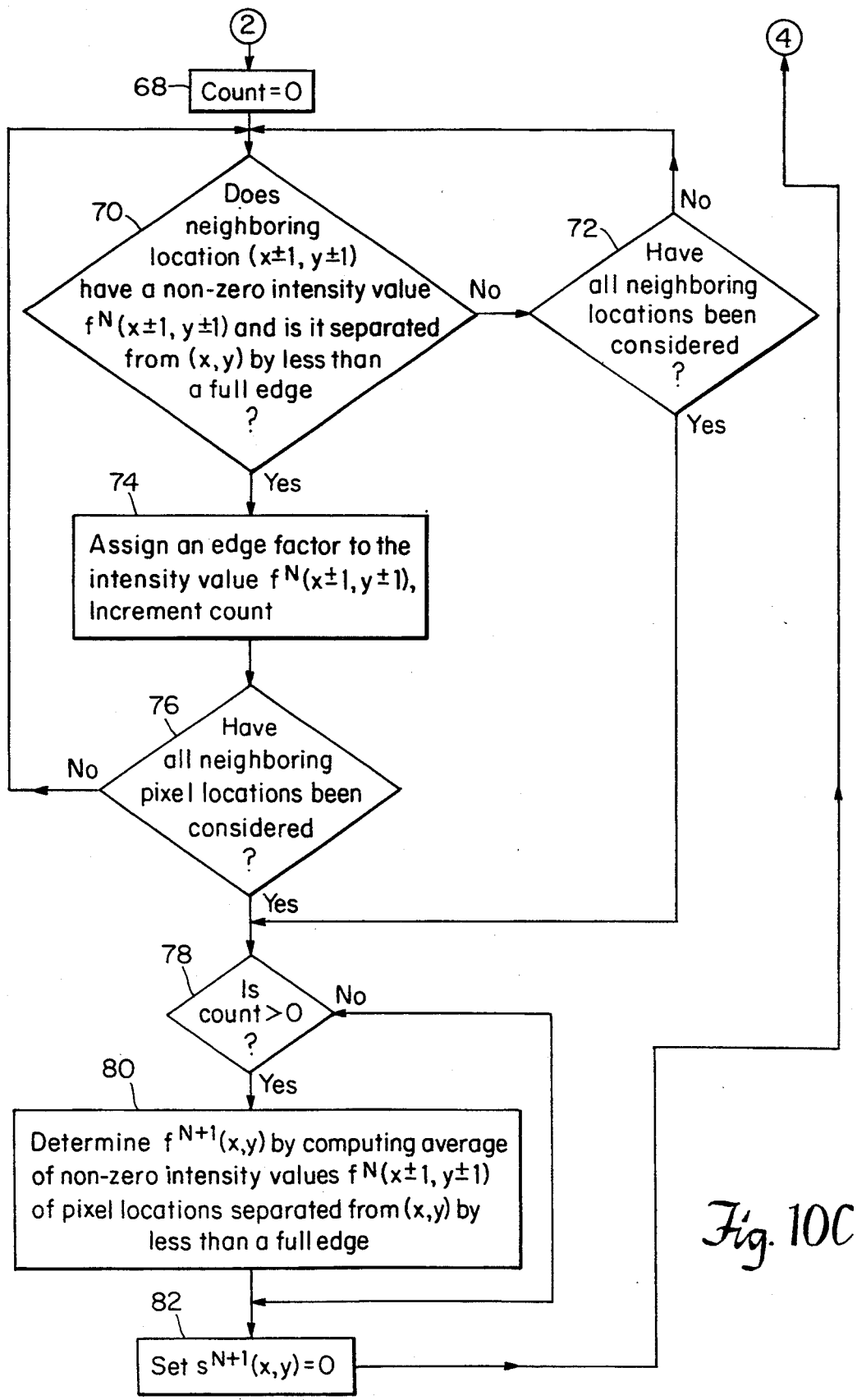

A flow chart of the image reconstruction process performed by the reconstruction module is shown in FIGS. 10A, 10B and 10C. Initially, the edge locations are located in IS(x,y) and the corresponding intensity values are located in F(x,y) (50).

Upon initiation of the reconstruction process, the edge locations (l(x,y)) stored in IS(x,y) are copied into S(x,y) at 50. The array S(x,y) is used to distinguish between pixel locations having a non-zero intensity data values and pixel locations without intensity data values. Initially, S(x,y) is identical to IS(x,y); however as the reconstruction process provides intensity data values to non-edge pixel locations, S(x,y) and F(x,y) change accordingly. Note that IS(x,y) does not change for a given image during reconstruction since the edge locations do not change.

After the iteration count has been initialized and maximum iteration count has been determined (52), the reconstruction module operates iteratively to reconstruct the image from the edge data (IS(x,y)) and associated intensity data (F(x,y)). For each iteration, the reconstruction module may operate on each pixel location (x,y) in a serial manner or it may operate on all locations (x,y) in parallel.

Accordingly for an iteration N and for a single pixel location (x,y), the reconstruction module determines if the pixel location corresponds to an edge location by examining $1^N(x,y)$ within IS(x,y) 54. If $1^N(x,y)$ equals one indicating that (x,y) is an edge location then no processing is performed to update the intensity $f^N(x,y)$ corresponding to (x,y) (55). If $1^N(x,y)$ equals zero indicating that (x,y) is not an edge location, the module determines whether (x,y) has a corresponding intensity data value by examining $s^N(x,y)$ (56). If $s^N(x,y)$ equals zero, then $f^N(x,y)$ is non-zero and $f^{N+1}(x,y)$ is determined by computing a weighted average of $f^N(x,y)$ and the intensities $f^N(x\pm1,y\pm1)$ of neighboring pixels. Alternatively, if $s^N(x,y)$ equals one, then $f^N(x,y)$ is zero and $f^{N+1}(x,y)$ is provided by averaging the intensities $f^N(x\pm1,y\pm1)$ of neighboring pixels.

For $f^N(x,y)$ being non-zero, the reconstruction module determines if a first pixel location, (x+1,y) for example, of the group of neighbors $(x\pm1,y\pm1)$ has a non-zero intensity value and if that first pixel location is separated from (x,y) by less than a full edge (i.e. $E_L(x+1,y)$ is not equal to zero) (58). If both conditions are not satisfied, the module repeats the step (58) until all neighbors within the group $(x\pm1,y\pm1)$ have been considered (60). However, if both conditions have been satisfied, the module assigns a weighting factor to the intensity $f^N(x+1,y)$ (62). The weighting factor is the product of $\mu$ and the edge factor $E_L(x+1,y)$. If all neighboring locations $(x\pm1,y\pm1)$ have not been considered, the process is repeated for neighboring pixels (x−1,y), (x,+1) and (x,y−1) (64). Then, $f^{N+1}(x,y)$ is computed (66) in accordance with equation (7) as follows:

$$f^{N+1}(x,y) = \frac{f^N(x,y) + \mu\Sigma f^N(x\pm1,y\pm1)E_L(x\pm1,y\pm1)}{1 + \mu\Sigma E_L(x\pm1,y\pm1)}.$$

For $f^N(x,y)$ being zero, the reconstruction module first sets the parameter count equal to zero (68). The module then determines if a first pixel location ((x+1,y) for example) of the neighboring pixel locations $(x\pm1,y\pm1)$ has a non-zero intensity and if it is separated from (x,y) by less than a full edge (i.e. $E_L(x+1,y)$ is not equal to zero) (70). If both conditions are not satisfied, the pixel (x+1,y) would not be considered in the computation of $f^{N+1}(x,y)$. The module returns to step (70) if all neighboring pixels $(x\pm1,y\pm1)$ have not yet been considered (72). However, if both conditions have been satisfied, the module assigns the edge factor $E_L(x+1,y)$ to the $f^N(x+1,y)$ and increments count (74). Depending on the value of $E_L(x+1,y)$, it may serve as a weighting factor for $f^N(x+1,y)$. If all neighboring pixels have not been considered (76), the module returns to step (70). Otherwise, the module then verifies that count is greater than zero (78). If count equals zero, then $f^{N+1}(x,y)$ is not computed. If count is greater than zero, at least one neighboring pixel location $(x\pm1,y\pm1)$ has a non-zero intensity value and is not separated from (x,y) by a full edge. Thus, $f^{N+1}(x,y)$ can be computed (80) in accordance with equation (9) as follows:

$$f^{N+1}(x,y) = \frac{\Sigma f^N(x\pm1,y\pm1)E_L(x\pm1,y\pm1)}{\Sigma E_L(x\pm1,y\pm1)}.$$

After $f^{N+1}(x,y)$ is computed, the module sets $s^{N+1}(x,y)$ equal to zero which indicates that the pixel location (x,y) now has a non-zero intensity value (82). The module subsequently determines whether the maximum iteration count (NMAX) has been reached (84). If NMAX has not been reached, the module increments N (86) and returns to step (54) to continue reconstruction processing. After NMAX iterations, directional spreading of the intensity data from the edges across the image produces a high quality reconstructed image.

While this invention has been particularly shown and described with reference to preferred embodiments thereof, it will be understood by those skilled in the art that various changes in form and details may be made therein without departing from the spirit and scope of the invention as defined by the appended claims. For example, although each pixel location is combined with adjacent neighbors in the smoothing process and in the reconstruction process, said pixel location may be combined with diagonally adjacent neighbors without departing from the spirit and scope of the invention. Though special purpose parallel processing hardware would provide higher speed operation, the invention has to date been implemented as software modules in a general purpose computer.

I claim:

1. A processing system for reconstructing an image having a pattern of intensities, the image being reconstructed from a set of edge location data values defining edges of regions of substantially uniform intensity of the image and a set of edge intensity data values quantifying intensity of the edges, comprising:

a memory having a plurality of addressable memory locations, each memory location having stored therein an intensity value for quantifying an intensity of a mapped image location, with each image location having a plurality of neighboring image locations, wherein the memory locations and intensity values are initialized from the set of edge location data values and the set of edge intensity data values; and a reconstruction module coupled to the memory for iteratively updating the intensities of the image locations, for each of a plurality of iterations the reconstruction module addresses a plurality of the memory locations and for each addressed memory location the reconstruction module updates the intensity value at the addressed memory location with a weighted combination of intensity values of neighboring image locations, the updated intensities from a current iteration being stored in the memory as intensity values to be updated during a subsequent iteration such that each iteration produces an incremental directional spreading of intensities from the edges of regions across the image.

2. A processing system as claimed in claim 1 in which the reconstruction module addresses the memory locations in parallel.

3. A processing system as claimed in claim 1 wherein the reconstruction module iteratively updates the intensity values of only addressed memory locations that are not mapped to an edge.

4. A processing system as claimed in claim 1 wherein the reconstruction module computes a weighted combination of the intensity values at addressed memory locations with the intensity values of each neighboring image location that has an absence of an intervening edge disposed between the mapped image location and the neighboring image location, the weighted combination updating the intensity value at the addressed memory location.

5. A processing system as claimed in claim 1 wherein the reconstructive module, for each addressed memory location that has a null intensity value, computes a weighted combination of the intensity values of the neighboring image locations to obtain the updated intensity value at the addressed memory location.

6. A processing system as claimed in claim 1 wherein an edge intensity data value defines the intensity of a plurality of edge locations of substantially uniform intensity.

7. A processing system for reconstruction of a two-dimensional image having a pattern of intensities, the image being reconstructed from a set of edge location data values defining edges of regions of substantially uniform intensity of the image and a set of edge intensity data values quantifying intensity of the edges of the regions, comprising:
a memory providing an array of addressable memory locations, each memory location having stored therein an associated intensity value for quantifying an intensity of a mapped image location, with each image location having a plurality of neighboring image locations, wherein the array of memory locations and intensity values are initialized from the set of edge location data values and the set of edge intensity data values;
a first group of software instructions for averaging, for an addressed memory location that has a null associated intensity value, the intensity values of the neighboring image locations;
a second group of software instructions for averaging, for an addressed memory location that has a non-null associated intensity value, the non-null intensity value at the addressed memory location with the intensity values of neighboring image locations; and
a processor for iteratively updating the intensity values of memory locations across the array, for each of a plurality of iterations the processor addressing a plurality of the memory locations and for each addressed memory location executing one of the first or the second group of software instructions to update the intensity of the mapped image location, the updated intensities from a current iteration being stored in the memory as intensity values to be updated during a subsequent iteration such that the iterative updating produces directional spreading of intensities from the edges of regions across the image.

8. A processing system as claimed in claim 7 wherein the first and second group of software instructions update the intensity values of the addressed memory locations in parallel.

9. A processing system as claimed in claim 7 wherein the first and second group of software instructions iteratively update the intensity values of non-edge addressed memory locations.

10. A processing system as claimed in claim 7 wherein the first group of software instructions averages the intensity values of each neighboring image location that has an absence of an intervening edge disposed between the mapped image location and the neighboring image location.

11. A processing system as claimed in claim 7 wherein the second group of software instructions averages the intensity value of each neighboring image location that has an absence of an intervening edge disposed between the mapped image location and the neighboring image location.

12. In a data processing system, a method of reconstructing an image having a pattern of intensities, the image being reconstructed from edge location data values defining edges of regions having substantially uniform intensity and edge intensity data values quantifying the intensity of the edges of the regions, comprising:
in a memory, providing a plurality of addressable memory locations each having an associated intensity value;
initializing the memory locations from the edge location data values, each memory location mapping to an image location, with each image location having a plurality of neighboring image locations;
initializing the intensity values from the edge intensity data values; and
incrementally producing directional spreading of intensities from edges of regions across the image by iteratively updating the intensity values of the memory locations, for each of a plurality of iterations addressing a plurality of the memory locations and for each addressed memory location updating the intensity of the mapped image location by computing a weighted combination of the intensity value at the addressed memory location with the intensity values of neighboring image locations, the updated intensities from a current iteration being stored in the memory as intensity values to be updated during a subsequent iteration.

13. A method as claimed in claim 12 wherein the memory locations are addressed in parallel.

14. A method as claimed in claim 12 wherein the iterative updating is performed for non-edge addressed memory locations.

15. A method as claimed in claim 12 wherein the neighboring image locations being combined have an absence of an intervening edge disposed between the mapped image location and the neighboring image location.

16. A method as claimed in claim 12 further comprising iteratively updating the intensity values of addressed memory locations that have a null intensity value by combining the intensity values of neighboring image locations.

17. A method as claimed in claim 16 wherein each neighboring image location is an image location that has an absence of an intervening edge disposed between the mapped image location and the neighboring image location.

18. A method as claimed in claim 12 wherein at least one intensity data value quantifies the intensity of a plurality of edge locations of substantially uniform intensity.

19. In a data processing system, a method of reconstructing an image having a pattern of intensities, the image being reconstructed from edge location data values defining edges of regions of substantially uniform intensity of the image and edge intensity data values quantifying the intensity of the edges of the regions, comprising:

in a memory, providing a plurality of addressable memory locations for storing intensity values;

initializing the memory locations from the edge location data values, each memory location mapping to an image location, with each image location having a plurality of neighboring image locations;

initializing the intensity values from the edge intensity data values; and producing directional spreading of intensities from edges of regions across the image by iteratively updating the intensity values of the memory locations, for each of a plurality of iterations addressing a plurality of the memory locations and for each addressed memory location updating the intensity values of the mapped image location by averaging, for each memory location that has a null intensity value, the intensity values of neighboring image locations, and averaging, for each addressed memory location that has a non-null intensity value, the non-null intensity values at the addressed memory location with the intensity values of neighboring image locations, the updated intensities from a current iteration being stored in the memory as intensity values to be updated during a subsequent iteration.

20. A method as claimed in claim 19 wherein each neighboring image location has an absence of an intervening edge disposed between the addressed memory location and the neighboring image location.

21. A method as claimed in claim 19 wherein the the memory locations are addressed in parallel.

22. An apparatus for image processing comprising:

an array of pixel locations representing an original image, each pixel location having an original intensity and a plurality of neighboring pixel locations;

an edge detection module for iteratively detecting pixel locations defining edges of regions of substantially constant intensity across the original image, for each detection iteration the edge detection module factoring, for each pixel location, a combination of a predetermined edge threshold and a sum of combinations of intensity of the neighboring pixel locations, the edge detection module determining pixel locations corresponding to edges based on a function of the factored combination for each pixel location;

a memory having an array of addressable memory locations mapped to an image, each memory location storing an associated intensity value representing the intensity a pixel location on the mapped image, the array and intensity values initialized from the pixel locations and original intensities of the edges of the original image; and a reconstruction module for reconstructing a replica of the original image from the memory, wherein the reconstruction module iteratively updates the intensity values of the memory locations across the array of addressable memory locations, for each of a plurality of iterations the reconstruction module addresses a plurality of the memory locations and for each addressed memory location the reconstruction module updates the intensity of the mapped pixel location by computing weighted combinations of the intensity values of the addressed memory locations with the intensity values of a plurality of neighboring pixel locations adjacent to the pixel location mapped to the addressed memory location, the updated intensities from a current iteration being stored in the memory as intensity values to be updated during a subsequent iteration such that the iterative updating producing directional spreading of intensities from edges to the image locations across the image.

23. An apparatus as claimed in claim 22 in which the edge detection module further comprises a smoothing module for iteratively filtering noise from the original intensities.

24. An apparatus as claimed in claim 23 wherein for each iteration the smoothing module performs a combination of the original intensity for each addressed pixel location with previously filtered intensities of the neighboring pixel locations and previously filtered intensity of the addressed pixel location.

25. An apparatus for image processing comprising:

an array of pixel locations, each pixel location having an original intensity data representing an original image;

a first group of software instructions for iteratively filtering noise from the original intensities;

a second group of software instructions for iteratively detecting pixel locations defining edges of regions of substantially constant intensity across the original image, wherein for each detection iteration the second group of software instructions, for each pixel location, factors a combination of an edge threshold and a sum of combinations of filtered intensities of the pixel locations and neighboring pixel locations, such that pixel locations defining edges are determined as a function of the factored combination for each pixel location;

a memory having an array of addressable memory locations, each memory location having stored therein an associated intensity value, the array representing the intensities of a mapped image, the array and intensity values initialized from the pixel locations defining the edges of the original image and the filtered intensity data representing the intensity of the pixel locations defining the edges of the original image;

a third group of software instructions for reconstructing a replica of the original image from the memory, wherein the third group of software instructions iteratively updates the intensity values of memory locations across the array, for each of a plurality of iterations the third group of software instructions addresses a plurality of the memory locations and for each addressed memory location the third group of software instructions updates the intensity of the mapped pixel location by computing weighted combinations of the intensity values of addressed memory locations with the intensity values of a plurality of neighboring pixel locations adjacent to the mapped image location, the updated intensities from a current iteration being stored in the memory as intensity values to be updated during a subsequent iteration to produce a directional spreading of intensities from the edges across the image; and a processor for processing the first, the second and the third group of software instructions.

26. An apparatus as claimed in claim 25 wherein for each iteration the first group of software instructions computes a combination of the original intensity data for each pixel location with previously updated intensity data of neighboring pixel locations and with previously updated intensity data for the pixel location.

27. In a data processing system having a processor, a method of image reconstruction comprising:

providing an array of addressable pixel locations for obtaining intensity data representing the intensities of an original image;

in the processor, iteratively filtering noise from the intensity data of each pixel location across the original image;

in the processor, iteratively detecting pixel locations defining edges of regions of substantially constant intensity across the image by factoring combinations of an edge threshold and a sum of combinations of filtered intensity data of neighboring pixel locations, such that pixel locations defining edges are determined as a function of the factored combination for each pixel location;

in a memory, having an array of addressable memory locations mapped to an image, each memory location storing an associated intensity value representing the intensity of a respective pixel location on the mapped image, the array and intensity values initialized from the pixel locations and the intensity data values of the edges of the original image; and in the processor, producing a directional spreading of intensities from pixel locations defining edges across the image by iteratively updating the intensity values of the memory locations, for each of a plurality of iterations addressing a plurality of the memory locations and for each addressed memory location updating the intensity of the mapped pixel location by computing weighted combinations of the intensity values at the addressed memory locations with the intensity values of a plurality of neighboring pixel locations, the updated intensities from a current iteration being stored in the memory as intensity values to be updated during a subsequent iteration.

28. A method as claimed in claim 27 wherein for each iteration the step of iterative filtering further comprises computing a combination of the original intensity data for each pixel location with previously updated intensity data of neighboring pixel locations and with previously updated intensity data of the addressed pixel location.

* * * * *

UNITED STATES PATENT AND TRADEMARK OFFICE
CERTIFICATE OF CORRECTION

PATENT NO. : 5,416,855
DATED : May 16, 1995
INVENTOR(S) : Davi Geiger It is certified that error appears in the above-identified patent and that said Letters Patent is hereby corrected as shown below:

Column 1, line 4, insert the following as the first paragraph:

---This invention was made with Government support under Contract No. DACA76-85-C-0010 by DARPA. The Government has certain rights in the invention.---

Signed and Sealed this

Twenty-ninth Day of August, 1995

*Attest:*

BRUCE LEHMAN

*Attesting Officer*     *Commissioner of Patents and Trademarks*